United States Patent
Lakshmi

(10) Patent No.: US 8,417,894 B2
(45) Date of Patent: Apr. 9, 2013

(54) DATA PROCESSING CIRCUIT WITH CACHE AND INTERFACE FOR A DETACHABLE DEVICE

(75) Inventor: Kranthi Lakshmi, Bangalore (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 13/126,092

(22) PCT Filed: Oct. 12, 2009

(86) PCT No.: PCT/IB2009/054472
§ 371 (c)(1),
(2), (4) Date: Apr. 26, 2011

(87) PCT Pub. No.: WO2010/049833
PCT Pub. Date: May 6, 2010

(65) Prior Publication Data
US 2011/0208917 A1    Aug. 25, 2011

(30) Foreign Application Priority Data

Oct. 28, 2008 (EP) ..................... 08167741

(51) Int. Cl.
*G06F 12/00* (2006.01)
*G06F 13/00* (2006.01)
*G06F 13/28* (2006.01)

(52) U.S. Cl.
USPC .................. 711/135; 711/118; 711/E12.017; 711/E12.022

(58) Field of Classification Search ........................ None
See application file for complete search history.

(56) References Cited

U.S. PATENT DOCUMENTS

| 5,778,431 | A | 7/1998 | Rahman et al. |
| 5,926,484 | A | 7/1999 | Takusagawa |
| 6,874,065 | B1 | 3/2005 | Pong et al. |
| 2004/0205303 | A1 | 10/2004 | Naveh et al. |

FOREIGN PATENT DOCUMENTS

| EP | 438808 A2 | 7/1991 |
| EP | 1 030 243 A1 | 8/2000 |
| EP | 1 313 014 A1 | 5/2003 |
| WO | 9722933 A1 | 6/1997 |

OTHER PUBLICATIONS

Interntional Search Report for Application PCT/IB2009/054472 (Jan. 7, 2010).

*Primary Examiner* — Edward Dudek, Jr.
*Assistant Examiner* — Matthew Chrzanowski

(57) ABSTRACT

A processor (10) of processes data using a cache circuit (12). The processor (20) is coupled to a functionally detachable device (19) via the cache circuit (12). When a cache line is loaded into cache memory (120), it is tested whether the cache line has an address within a detachable device address range allocated to the detachable device (19). If so, identification of the cache line, or a range of addresses that includes the address of the cache line is stored. When a flush command is received that requires write back cached data to the detachable device, the identification is used to select the cache line for selective write back to the detachable device. Thus less cache data needs to be invalidated when a device is functionally detached from the circuit.

10 Claims, 2 Drawing Sheets

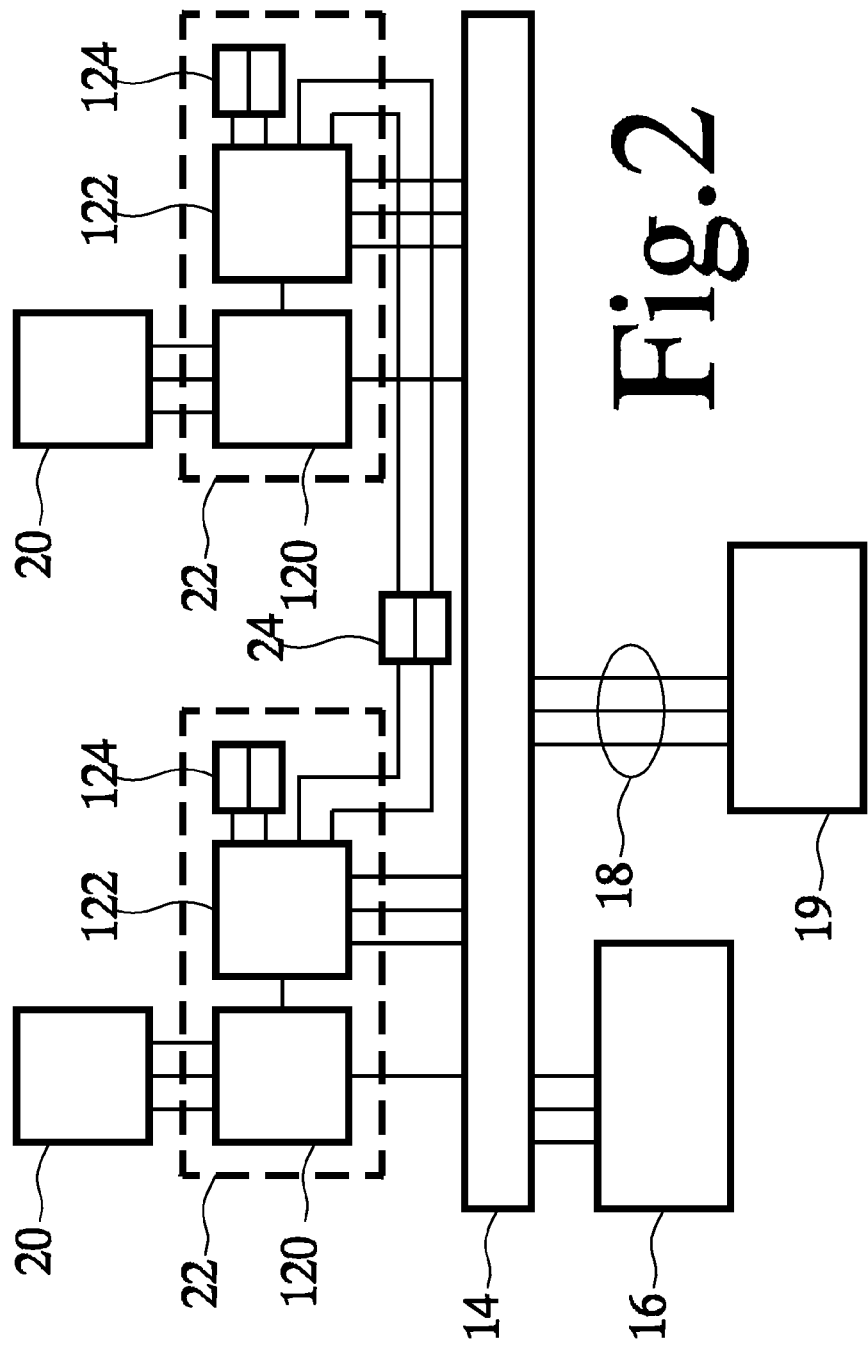

DATA PROCESSING CIRCUIT WITH CACHE AND INTERFACE FOR A DETACHABLE DEVICE

FIELD OF THE INVENTION

The invention relates to a data processing circuit and to a method of performing data processing.

BACKGROUND OF THE INVENTION

U.S. Pat. No. 5,778,431 discloses a data processing circuit with a dynamically detachable device. A part of the memory space of the data processing circuit is associated with the detachable device. The data processing circuit has a cache memory. When the detachable device is detached during operation, a problem can arise when data corresponding to the addresses for the detachable device is stored in the cache memory. After detachment, write back from the cache memory is no longer possible, so that inconsistencies can arise. Therefore special measures are needed in relation to caching of data from such a detachable device.

One way to circumvent this problem is to avoid all caching data for addresses associated with the detachable device, but this reduces system performance. U.S. Pat. No. 5,778,431 discloses a solution that involves automatic write back of cache lines that contain data for addresses in the detachable device. Two registers are provided, containing data that indicates a start address and an end address of said part of the memory space respectively. Two comparators compare address tags of cached data with the data in the registers. On detachment of the device the address tags of all cache lines are compared with the start and end address and cache lines that are found to have address tags between start and end address are invalidated.

However, it has been found that this leads to excessive invalidation of data.

SUMMARY OF THE INVENTION

Among others, it is an object to provide for a data processing circuit with reduced invalidation of cache data when a device is functionally detached from the circuit and/or reduced need for write back cached data to the detachable device.

A data processing circuit according to claim 1 is provided. Herein a cache circuit is coupled between a processor and an interface for a detachable device. The cache circuit comprises a cache control circuit configured to write back selectively a part of cached data in response to the flush command. Upon loading a cache line into cache memory the cache control circuit tests whether the cache line has an address within an address range allocated to the detachable device, and if so, it stores an identification covering the cache line for use in flushing. The identification may cover the cache line cache line for example because it contains an address or address part that identifies the cache line, or because the identification represents a range of addresses including the address of the cache line, or because the identification identifies a cache line storage element in which the cache line is stored, for example when each cache line storage element has a flag, by setting a flag for the cache line storage element where the cache line is loaded, or by storing a pointer to the cache line storage element where the cache line is stored. The identification makes it possible to write back selected cache lines quickly, with little circuit overhead during execution of a flush command.

In an embodiment a representation of a range of addresses, such a start and end address, or a start address and length is used to indicate the cache lines that will be written back in response to the flush command. The range is expanded when loading of a cache line detected that is outside the range, but at an address in the range allocated to the detachable device. It has been found that in many cases cache lines for consecutive addresses are loaded. As a result, the use of a representation of a range can be used to select cache lines for write back with little circuit overhead and with a minimum of unnecessary write back. Registers in the cache circuit may be used to represent the range.

In an embodiment storage space for a single address for storing an address or address part identifying an individual cache line with an address in the range allocated to the detachable device. Storage space may be provided for a plurality of individual addresses or address part identifying respective individual cache lines. When more cache lines with address in the range allocated to the detachable device than can be stored in the storage space, the cache control circuit switches to a search mode to search for cache lines to be written back upon receiving the flush command.

Common storage space may be used for storing identification of the cache lines for flushing applicable to a plurality of cache circuits. This reduces overhead.

BRIEF DESCRIPTION OF THE DRAWINGS

These and other objects and advantageous aspects will become apparent from a description of exemplary embodiments, using the following Figures.

FIG. 2 shows a data processing circuit with a plurality of processors

DETAILED DESCRIPTION OF THE EMBODIMENTS

Figure 1:
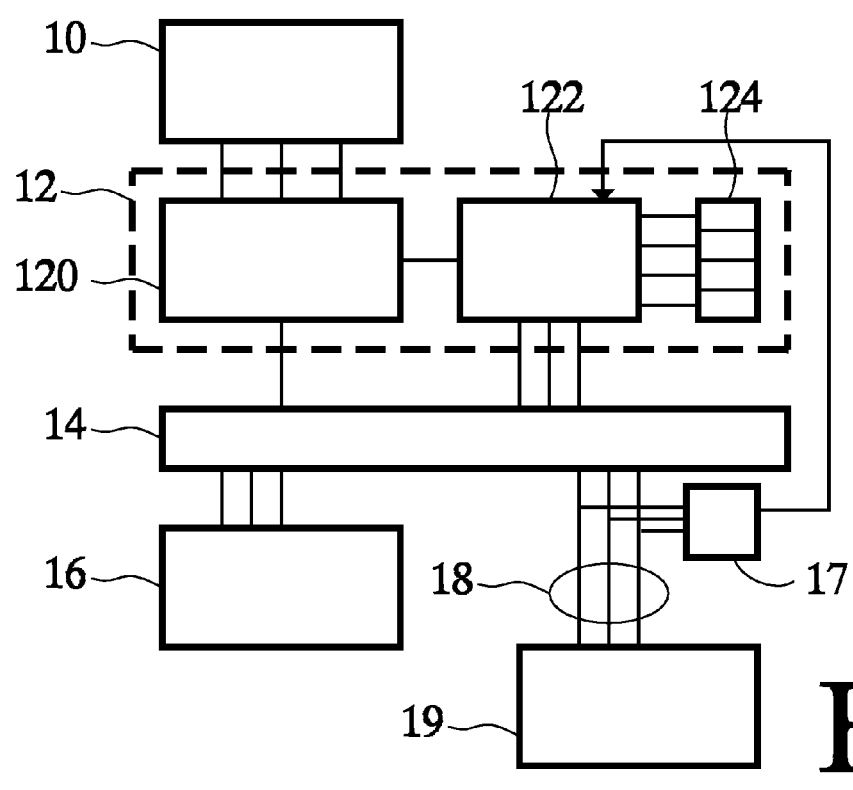
FIG. 1 shows a data processing circuit with a cache and a detachable device.

FIG. 1 shows a data processing circuit, comprising a processor 10, a cache circuit 12, a communication circuit 14, a memory circuit 16, an optional detachment detector 17 and an interface 18 for a detachable device. By way of example a device 19 is shown attached to interface 18. By "detachable" it is meant that device 19 is can be functionally detached in any way during operation, for example by means of physical detachment, or movement out of reception range of a wirelessly communicating device, but also when power supply to the device is cut off or the operating mode of the device is changed so that it is no longer able to receive write back data from the cache memory etc.

Processor 10 is coupled to communication circuit 14 via cache circuit 12. Via communication circuit 14, the processor 10 and cache circuit 12 are coupled to memory circuit 16 and interface 18. Cache circuit 12 comprises a cache memory 120, a cache control circuit 122 and a set of registers 124. Cache memory 120 has ports coupled to processor 10 and communication circuit 14. Cache control circuit 122 is coupled to cache memory 120, communication circuit 14 and the set of registers 124. Detachment detector 17 is optional. When used, it has an input coupled to interface 18. By way of example, detachment detector 17 is shown with an output directly coupled to cache control circuit 122. Detachment detector 17 is configured to detect the onset of detachment and generate a signal indicating imminent detachment.

In operation processor 10 executes a task which involves accessing data addressed by addresses in its memory space.

The task may be performed under control of a task specific computer program for example. The addresses map to storage locations in memory circuit 16 and detachable device 19, when it is attached to interface 18.

In way that is known per se, cache circuit 12 caches data for at least part of these addresses. When processor 10 reads from an address and data for that address is stored in cache memory 120, cache circuit 12 returns the data from cache memory 120 to processor 10. If the data for an address is not stored in cache memory 120, cache memory 120 alerts cache control circuit 122, which issues the address, or part of it, to memory circuit 16 or detachable device 19 via communication circuit 14, to retrieve data for the address for supply to processor 10.

Cache control circuit 122 controls cache memory 120 to store the returned data in association with the address. Such storage in association with an address is also known per se. In an embodiment, a cache line with data for a plurality of addresses is stored in association with an address tag to identify part of the address of the data in the in the cache line. In other embodiments address tags for individual addresses may be stored. Part of the address may be implicit in the place where the data is stored in cache memory 120. If necessary, cache control circuit 122 "evicts" (invalidates) old data in cache memory 120 to make room for storing the newly retrieved data.

Set of registers 124 contains first registers for keeping information that identifies a range of addresses associated with detachable device 19 and at least one register for keeping information identifying a cache line used for addresses in that range that is stored in cache memory 120. When cache control circuit 122 causes a cache line to be stored in cache memory 120, cache control circuit 122 compares an address used to address a cache line (or data therein) via communication circuit 14 with the range of addresses associated with detachable device 19, based on the information in the registers in set of registers 124. If cache control circuit 122 detects that the address used for the cache line lies within that range, cache control circuit 122 causes an identification of the cache line to be stored in a second register from set of registers 124.

Upon receiving a request (flush command) from detachable device 19, or optionally upon receiving the imminent detachment signal from detachment detector 17, cache control circuit 122 accesses the second register from set of registers 124 to determine whether cache memory 120 contains a cache line with an address in the range defined for detachable device 19. If so, cache control circuit 122 selectively causes this cache line to be written back. Instead of supplying a signals from detachment detector 17 directly to cache control circuit 122, the signals may be provided to processor 10, or any other circuit (not shown), to trigger generation of a flush command. In an embodiment, detachment detector 17 may be configured to detect detachment after detachment has taken place. In this case processor 10 may be configured to respond to a signal from detachment detector 17 by testing whether set of registers 124 indicates that written data for at least one address in detachable device 19 is in cache memory 120 and if so to issue a prompt to reattach detachable device before performing write back.

In an embodiment cache control circuit 122 may also invalidate these written back cache lines in response to the flush command indicated by the request or the signal from detachment detector 17. This prevents further use of the cached data. Alternatively, cache control circuit 122 may leave the data valid, to enable processor to complete a current task using this data. In this case, cache control circuit 122 may respond to the flush command by blocking subsequent writing for these cache lines.

The identification of the cache line in the second register may take the form of an address or address part. In this case cache control circuit 122 may select the location in cache memory 120 that stores the cache line by comparing an address tag from the second register with address tags for locations in the cache memory. In an n-way set associative memory, this may comprise using the address or address part from the second register to identify the set that stores the cache line and comparison of part of the address with tags for different ways to identify the way that stores the cache line. Alternatively, the second register may contain a direct cache memory address, for example identifying a set and a way directly.

If the second register is capable of storing information for only one cache line, special measures may be needed when it is possible that more than one cache line in the range for detachable device 19 is present in the cache.

In an embodiment, cache control circuit 122 may record in set of registers 124 whether more than more than one such cache line is in cache memory 120. If so, in this embodiment cache control circuit 122 may switch to testing all cache lines in cache memory 120 for data in the range for detachable device 19 and writing back all these cache lines. In another embodiment, a plurality of registers in set of registers 124 may be used to represent respective addresses of cache lines in the range of detachable device 19 that are in cache memory 120. In this embodiment cache control circuit 122 use these registers to select cache lines for all of these addresses. If the number of available registers is smaller than the number of cache lines with addresses in the range of the detachable device, cache control circuit 122 may write back all cache lines with addresses in the range of the detachable device.

In another embodiment, cache control circuit 122 may use two second registers from set of registers 124 to represent lower and upper addresses of the cache lines from that range in cache memory 120. In this embodiment cache control circuit 122 may write back all cache lines for addresses from the lower address to the upper address. Cache control circuit 122 updates the content of these registers dependent on the addresses of cache lines that are loaded into cache. Cache control circuit 122 may compare these addresses of loaded caches lines both with the range of addresses allocated to detachable device 19 and with the range represented by the second registers. Cache control circuit 122 expands the latter range to include the address of a newly the loaded caches line, if that address is within the range of addresses allocated to detachable device 19, but outside the range represented by the second registers.

Set of registers 124, may be implemented using separate registers, or by means of an auxiliary memory wherein the registers are respective memory locations. cache control circuit 122 may be a programmable circuit, with a program memory with a fixed program to perform the functions as described. Alternatively, dedicated circuits may be provided in cache control circuit 122 to perform these functions.

FIG. 2 shows an embodiment of the data processing circuit with a plurality of processors 20 (two shown by way of example, but more may be used), each with its own cache circuit 22 coupled between the processor 20 and the communication circuit 14. Herein one common set of registers 24 is provided for all of the cache circuits 22, to define the address range associated with detachable device 19. In cache circuits 22 respective sets of registers 26 are provided for storing information about the cache lines for addresses within this range in respective cache circuits 22. In this embodiment, the cache control circuits 122 of the cache circuits 22 use the common set of registers 24 to compare with the address of cache lines that are newly stored in their cache memories 120, in order to decide whether to write information about those cache lines to their respective set of registers 26.

Upon receiving the flush command the common set of registers 24 may be used to control write back from all cache circuits 22. A common control module may be provided to control write back from all cache circuits. The common control module may be implemented as a detachment detector (not shown), or other flush command generator, coupled to the interface for the detachable circuit and to the cache control circuits 122 of the cache circuits 22 each of the processors 20. Alternatively a detachment detector, or other flush command generator, coupled to one of the processors 20 may be used, that processor comprising a software flush control module to respond to a detachment signal by issuing flush commands to all cache circuits. Any other location of the flush control module may used.

In an alternative embodiment, copies of the information that defines the address range associated with detachable device 19 may be stored in each of the respective sets of registers 26 for use by cache control circuits 122.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A data processing circuit, comprising a processor, an interface for a functionally detachable device and a cache circuit coupled between the processor and said interface, the cache circuit comprising:
    a cache memory; and
    a cache control circuit configured to test, upon loading a cache line into the cache memory, whether the cache line has an address within a detachable device address range allocated to a functionally detachable device when coupled to said interface, and if so, to store an identification of addresses covering the cache line, the cache control circuit further being configured to receive a flush command, and to respond to the flush command by writing back selectively a part of cached data, selected under control of the stored identification.

2. A data processing circuit according to claim 1, comprising storage space for storing a representation of boundaries of an update range of addresses for which data has to be written back, the cache control circuit being configured to update the stored representation to expand said update range upon loading the cache line into the cache memory, if the address of the cache line is in the detachable device address range and outside said update range.

3. A data processing circuit according to claim 2, wherein the storage space comprises a first register for storing a start address or address part of the update range and a second register, for storing an end address or address part of the update range, or a representation of a length of the update range.

4. A data processing circuit according to claim 1, comprising storage space for storing identification of a first cache line and information indicating that write back is needed for more than one cache line, the cache control circuit being configured to
    store the identification of the first cache line upon loading the first cache line when the first cache line has an address within the detachable device address range, and to
    store the information indicating that write back is needed for more than one cache line upon loading a subsequent cache line, when the subsequent cache line has an address within the detachable device, the cache control circuit being configured to
    switch between write back only based on the identification of the first cache line and searching for cache lines in the detachable device address range dependent on information indicating that write back is needed for more than one cache line, in responding to the flush command.

5. A data processing circuit according to claim 4, wherein the storage space comprises a register for storing an address or address part of the first cache line.

6. A data processing circuit according to claim 1, wherein the cache memory comprises:
    associative cache line storage elements and
    storage locations associated with respective ones of the storage elements, the cache control circuit being configured to set a flag in the storage location associated with the cache line storage element in which the cache line is stored, upon loading the cache line when the cache line has an address within the detachable device address range.

7. A data processing circuit according to claim 1, wherein the cache memory comprises associative cache line storage elements and a flag storage location, the cache control circuit being configured to set an association between the flag storage location and the cache line storage element in which the cache line is stored, upon loading the cache line when the cache line has an address within the detachable device address range.

8. A data processing circuit according to claim 1, comprising a plurality of processors, and a plurality of cache circuits coupled between said interface for the detachable device and respective ones of the processors, the processing circuit furthermore comprising common storage space for storing said identification applicable to all cache circuits.

9. A data processing circuit according to claim 8, comprising a flush control module configured to respond to the flush command for the detachable device by causing the plurality of cache circuits each to write back cached data selectively based on said identification applicable to all cache circuits.

10. A method of processing data using a processor coupled to a functionally detachable device, with a cache circuit with a cache memory coupled between the processor and the detachable device, the method comprising:
    loading a cache line into the cache memory;
    testing, upon said loading, whether the cache line has an address within a detachable device address range allocated to the detachable device;
    if the address is in the detachable device address range, storing an identification covering the cache line;
    receiving a flush command to write back selectively a part of cached data;

using the identification for selecting the cache line for said write back.

* * * * *